US011300422B2

(12) United States Patent
Tada et al.

(10) Patent No.: US 11,300,422 B2
(45) Date of Patent: Apr. 12, 2022

(54) INFORMATION PROVISION APPARATUS AND METHOD OF CONTROLLING THE SAME

(71) Applicant: HONDA MOTOR CO., LTD., Tokyo (JP)

(72) Inventors: Masahiro Tada, Wako (JP); Lei Tian, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 523 days.

(21) Appl. No.: 16/291,253

(22) Filed: Mar. 4, 2019

(65) Prior Publication Data

US 2019/0285429 A1  Sep. 19, 2019

(30) Foreign Application Priority Data

Mar. 19, 2018 (JP) .............................. JP2018-051151

(51) Int. Cl.
*G06F 17/00* (2019.01)
*G01C 21/36* (2006.01)
*G06K 9/00* (2022.01)

(52) U.S. Cl.
CPC ...... *G01C 21/3617* (2013.01); *G01C 21/3611* (2013.01); *G06K 9/00369* (2013.01)

(58) Field of Classification Search
CPC ............ G01C 21/3617; G01C 21/3611; G01C 21/3697; G06K 9/00369; G06K 9/6201; G06K 9/00288; G06K 9/00832
USPC ........................................................ 701/424
See application file for complete search history.

(56) References Cited

U.S. PATENT DOCUMENTS 9,159,153 B2 * 10/2015 Chen ...................... G06T 17/05
10,373,080 B2 * 8/2019 Mrad ...................... G06F 16/00
10,788,332 B2 * 9/2020 DeLuca ............. G01C 21/3608
(Continued)

FOREIGN PATENT DOCUMENTS

JP       2004-213175 A      7/2004
JP       2008-241348 A     10/2008
JP       2010-237134 A     10/2010

OTHER PUBLICATIONS

Japanese Office Action for Japanese Patent Application No. 2018-051151 dated Oct. 22, 2021 (partially translated).

*Primary Examiner* — Ronnie M Mancho
(74) *Attorney, Agent, or Firm* — Thomas | Horstemeyer, LLP (57) ABSTRACT

An information provision apparatus comprises: a processor; and a memory storing instructions which, when executed by the processor, cause the apparatus to function as: an obtaining unit configured to identify a plurality of people and obtain registration information for each of the plurality of people; an information provision unit configured to, in order to cause information to be perceivably outputted from an output unit to the plurality of people, provide predetermined information to the output unit; and a selection unit configured to select the predetermined information, wherein the selection unit, in a case where there is a person for whom the registration information cannot be obtained, selects the predetermined information based on input information obtained via an input unit for the person for whom the registration information cannot be obtained.

9 Claims, 9 Drawing Sheets

(56) References Cited

U.S. PATENT DOCUMENTS

| | | | |
|---|---|---|---|
| 2009/0192702 A1* | 7/2009 | Bourne | G01C 21/3492 701/532 |
| 2009/0299857 A1* | 12/2009 | Brubaker | G06Q 30/0247 705/14.66 |
| 2011/0313853 A1* | 12/2011 | Ramer | G06Q 30/0247 705/14.46 |
| 2014/0309927 A1* | 10/2014 | Ricci | G06K 9/00832 701/424 |
| 2015/0227890 A1* | 8/2015 | Bednarek | G06Q 30/0635 705/26.81 |
| 2015/0228004 A1* | 8/2015 | Bednarek | G06Q 10/08355 705/26.8 |
| 2016/0021155 A1* | 1/2016 | Sawato | G06F 3/04817 455/456.1 |
| 2017/0337573 A1* | 11/2017 | Toprak | G07C 5/006 |
| 2018/0285463 A1* | 10/2018 | Choi | G06F 16/9535 |
| 2018/0335921 A1* | 11/2018 | Karunamuni | G06F 3/04845 |
| 2019/0285429 A1* | 9/2019 | Tada | G06K 9/00832 |
| 2020/0034635 A1* | 1/2020 | Sato | G01C 21/26 |

* cited by examiner

| GROUP IDENTIFICATION | MEMBERS | ACTION HISTORY (VISITED LOCATION) | SELECTION HISTORY (CONTENT) |
|---|---|---|---|
| GROUP α | A,B,C | LOCATIONS {1,2} | CONTENT {a} |
| GROUP β | A,X,Y,Z | LOCATIONS {5,6,7} | CONTENT {b,c,d} |
| GROUP γ | A,B,D | LOCATIONS {8} | CONTENT {e} |
| GROUP Δ | A,B,R,S | LOCATIONS {9,10} | CONTENT {f} |
| ... | ... | ... | ... |

| LOCATION | HIGH LEVEL CATEGORY | LOW LEVEL CATEGORY |
|---|---|---|
| LOCATION 1 | RESTAURANT | THAI RESTAURANT |
| ... | ... | ... |
| LOCATION 5 | RESTAURANT | FAMILY RESTAURANT |
| LOCATION 6 | GAME FACILITY | AMUSEMENT PARK |
| LOCATION 7 | SPORT FACILITY | BASEBALL FIELD |
| ... | ... | ... |

| CONTENT | HIGH LEVEL CATEGORY | LOW LEVEL CATEGORY |
|---|---|---|
| CONTENT a | NEWS | SPORTS NEWS |
| CONTENT b | MOVIE | CHILDREN-ORIENTED ANIMATION |
| CONTENT c | VARIETY | COMEDY |
| CONTENT d | MUSIC | CLASSICAL MUSIC |
| ... | ... | ... |

INFORMATION PROVISION APPARATUS AND METHOD OF CONTROLLING THE SAME

CROSS-REFERENCE TO RELATED APPLICATION(S)

This application claims priority to and the benefit of Japanese Patent Application No. 2018-051151, filed Mar. 19, 2018, the entire disclosure of which is incorporated herein by reference.

BACKGROUND OF THE INVENTION

Field of the Invention

The present invention relates to an information provision apparatus and a method of controlling the same.

Description of the Related Art

In recent years, a technique for changing a configuration of a genre list for destinations to be searched in accordance with the presence of a passenger in the vehicle when a destination is searched for on a navigation apparatus is known (Japanese Patent Laid-Open No. 2008-241348). Japanese Patent Laid-Open No. 2008-241348 discloses a technique in which, in a case where a determination is made with respect to a weight signal for a passenger, and it is determined that a child is on-board, a genre list for children is presented, and in a case where a seatbelt attachment/detachment is detected, and there are determined to be multiple passengers, a genre list for a family is displayed.

Incidentally, in addition to cases in which a destination is searched for, there are cases in which news information, destination information, moving image information, and the like, is outputted from an information provision apparatus such as a navigation apparatus. In cases where there are people such as passengers in the vicinity, there are cases in which it is more enjoyable when the information that is outputted is related to common interests and topics among the people in the vicinity. Accordingly, it is useful to be able to register information on people in advance, and to provide information that is suitable for multiple people there at the time based on what is registered. Meanwhile, it may be cumbersome to continuously maintain a state in which multiple people are registered, even if it is possible to provide information that is suitable for registered people. In other words, it would be desirable to provide information that corresponds to the people there at the time in a case where information is registered for some of the people and not registered for others.

SUMMARY OF THE INVENTION

The present invention has been made in consideration of the aforementioned problems, and realizes a technique that enables the provision of information corresponding to the people there at the time, even in a case where information is registered for some of the people and not for others.

In order to solve the aforementioned problems, one aspect of the present invention provides an information provision apparatus comprising: a processor; and a memory storing instructions which, when executed by the processor, cause the information provision apparatus to function as: an obtaining unit configured to identify a plurality of people and obtain registration information for each of the plurality of people; an information provision unit configured to, in order to cause information to be perceivably outputted from an output unit to the plurality of people, provide predetermined information to the output unit; and a selection unit configured to select the predetermined information, wherein the selection unit, in a case where there is a person, among the plurality of people, for whom the registration information cannot be obtained, selects the predetermined information based on input information obtained via an input unit for the person for whom the registration information cannot be obtained.

Another aspect of the present invention provides, a control method of an information provision apparatus comprising: identifying a plurality of people and obtaining registration information for each of the plurality of people; in order to cause information to be perceivably outputted from an output unit to the plurality of people, providing predetermined information to the output unit; and selecting the predetermined information, wherein in the selecting, in a case where there is a person, among the plurality of people, for whom the registration information cannot be obtained, the predetermined information is selected based on input information obtained via an input unit for the person for whom the registration information cannot be obtained.

According to the present invention, it is possible to provide information that corresponds to the people there at the time in a case where information is registered for some of the people and not registered for others.

Further features of the present invention will become apparent from the following description of exemplary embodiments (with reference to the attached drawings)

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS (First Embodiment)

Exemplary embodiments of the present invention will be explained hereinafter in detail, with reference to the drawings. Note that in the following description, an example of a case in which an information provision apparatus 200 is arranged in a vehicle, and information is outputted to people in the space within that vehicle will be described. However, the present invention is not limited to this embodiment, and can be applied to a case in which information is outputted to people in the space within a plurality of separate vehicles, and to a case in which information is outputted to a plurality of people in a conference room or a home (or multiple separate rooms).

<Information Provision System Configuration>

Figure 1:
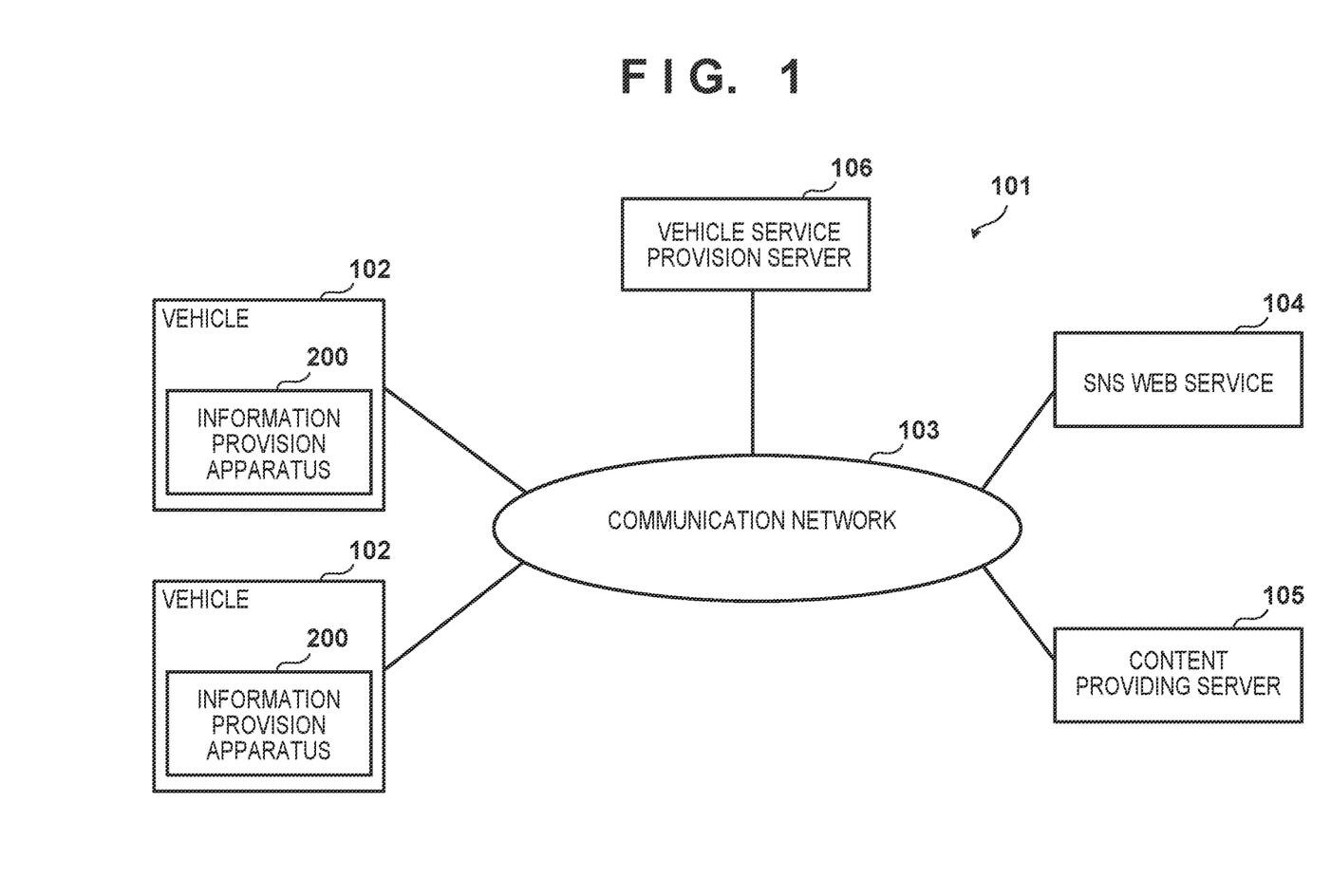
FIG. 1 is a view for illustrating an example of an information provision system according to a first embodiment.

With reference to FIG. 1, a configuration of an information provision system 101 according to the present embodiment will be described. A vehicle 102 is a vehicle that travels on four wheels, for example, and a plurality of people can ride in the vehicle. In the vehicle, the information provision apparatus 200, which is for perceivably outputting information to the plurality of people, is arranged.

A network 103 includes a communication network such as, for example, the Internet or a mobile network, and transmits information between the information provision apparatus 200, which is connected to the network 103, and various servers. An SNS web service 104 holds information (social graph information and information of a group in the service) that indicates a relation between users participating in the service, and provides, as a web service, information indicating the relation between users to an external unit.

A content providing server 105 provides various information via the Internet. The various information may include, for example, news information, blog information, moving images, music, content information of an SNS service, map information, information related to restaurants or entertainment facilities, and the like.

A vehicle service provision server 106 has a passenger information database for storing, for example, passenger information (also referred to as registration information) that is registered or collected for each person, such as driver information that a driver registered, passenger information that is registered when the passenger also rides in the vehicle, and the like. The passenger information is provided from the information provision apparatus 200 of each of a plurality of vehicles. Furthermore, the vehicle service provision server 106 has a group information database in which group information is stored. In the group information, passengers (including the driver and other passengers) registered by group in the information provision apparatus 200 and relatedness information of the passengers in the group (for example, family, friends, co-workers, or the like) are stored, and this information is provided from the information provision apparatus 200. Details of the group information will be described later.

<Information Provision Apparatus Configuration>

Figure 2:
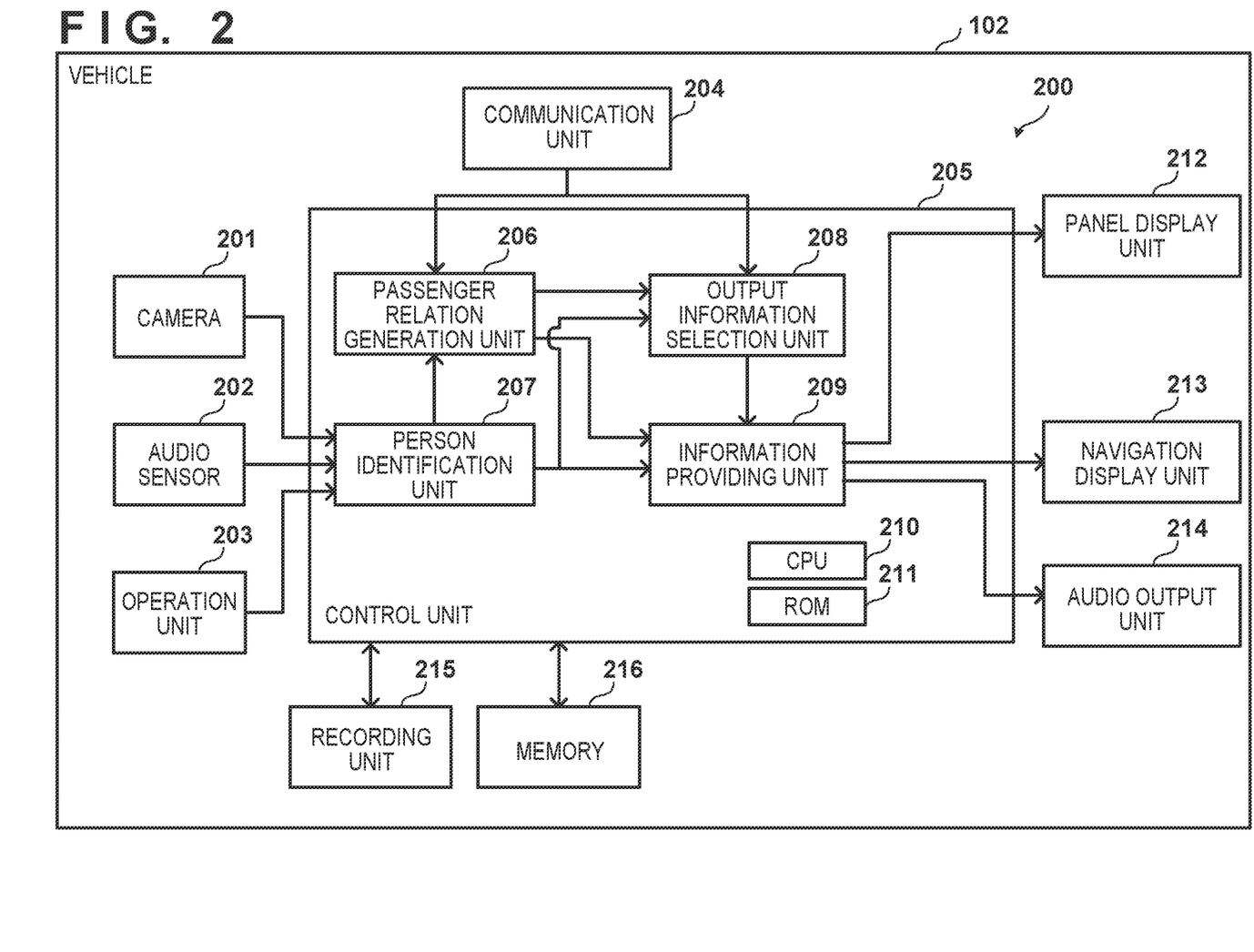
FIG. 2 is a block diagram for illustrating an example of a functional configuration of an information provision apparatus according to the first embodiment.

Next, with reference to FIG. 2, an example of a functional configuration of the information provision apparatus 200 will be described. In FIG. 2, key functional blocks and key connection relationships in the information provision apparatus 200 which is arranged in a vehicle are indicated. Each functional block illustrated in this view may be integrated or separated, and functions that are described may be realized by other blocks. Also, respective functional blocks may have a connection relationship that is not shown graphically. Furthermore, what is described as hardware may be realized as software and vice-versa.

A camera 201 obtains a state within the vehicle as image information. In the present embodiment, an image for identifying passengers in the vehicle 102 is obtained. An audio sensor 202 obtains audio of speech uttered within the vehicle by the passengers. In the present embodiment, audio data for identifying passengers in the vehicle 102 is obtained. An operation unit 203 includes buttons, dials, a touch input panel, or the like for a passenger such as the driver to provide operation instructions to the information provision apparatus 200, and the operation unit 203 receives such input operations and notifies operation information to the control unit 205.

A communication unit 204 includes a communication circuit for communicating with an external vehicle service provision server 106 and the content providing server 105 via the network 103. For example, the network 103 is connected to by performing communication compliant with the LTE-Advanced standard.

The control unit 205 includes a CPU 210 which is a central processing unit and a ROM 211 which is a non-volatile memory. The CPU 210, by loading a program stored in the ROM 211 into a memory 216 and executing the program, controls an operation of each unit within the control unit 205 and controls an operation of each unit of the information provision apparatus 200. A function of the control unit 205 may be realized by one CPU 210, and may be realized using another CPU and a GPU (not shown).

Figure 5A:
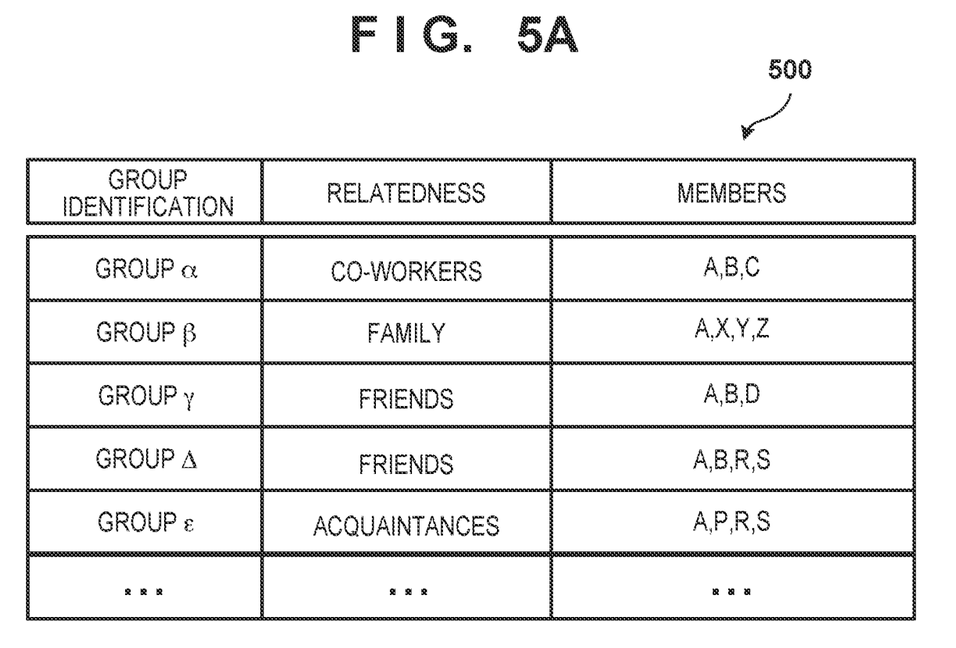
FIG. 5A is a view for describing group information including a relatedness of passengers according to the first embodiment.

A passenger relation generation unit 206 generates group information including passengers (including the driver and passengers) registered by group and relatedness information (for example, family, friends, co-workers, or the like) between the passengers in the group, and records them in a recording unit 215, for example. For example, FIG. 5A schematically illustrates group information 500 of the present embodiment. In the group information 500, information that identifies a group, passengers who comprise each group (identification information), and a relatedness of passengers that comprise the group are recorded. In the relatedness of passengers, it is possible to set relatednesses of, for example, family, friends, co-workers, acquaintances, or the like. Here, "acquaintances" is the loosest relation between passengers, and is an example that represents a relatedness between passengers in a case where no particular common relatedness has been set.

Figure 5B:
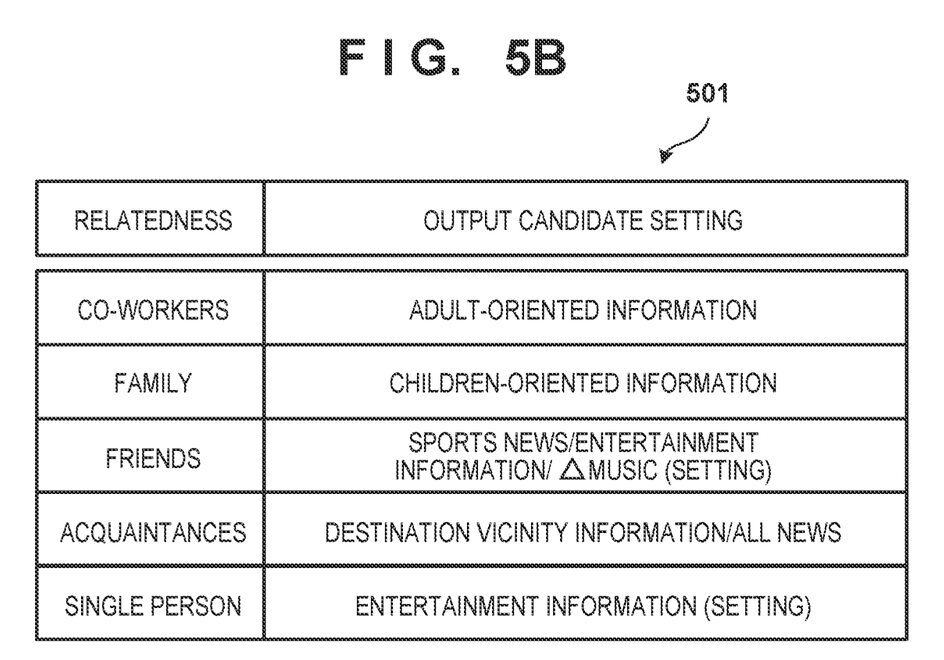
FIG. 5B is a view for describing output candidate setting information according to the first embodiment.

In a relatedness designated by the group information, output candidate setting information 501 is set, as illustrated in FIG. 5B. The output candidate setting information is information that sets what kind of information is to be provided as candidate information for each relatedness, and is set in advance. For example, in the "family" relatedness, it is set that child-oriented information be included in the candidate information. The child-oriented information may include, for example, information such as a child-oriented video such as an animation, child-oriented music, news related to such videos or music, an educational video, classical music, or the like. For example, in the "co-worker" relatedness, it is set that adult-oriented information be included in the candidate information. Adult-oriented information may include, for example, social news, economic news, a sports video, an entertainment video, and the like, and classical music, and the like. Note that the candidate information setting may be set in accordance with an operation instruction inputted by a passenger via the operation unit 203, for example, so that it is possible to obtain information of output candidates that are more suitable to the group. For example, configuration may be taken so that it is possible to set a specific category in which the members have a common interest, for the "friend" relatedness. In the example of FIG. 5B, specific news, information, and music is set. Also, in the example of FIG. 5B, it is similar for an example of a case where the relatedness is "single person", and a specific category (for example, entertainment information) is set, for example, so that it is possible to obtain candidate information that is more in accordance with individual preferences.

Group information illustrated in FIG. 5A is generated when, for example, a passenger (including a non-driver passenger) is registered in passenger registration processing described later. In such a case, the passenger relation generation unit 206 can generate group information based on passenger information identified by a person identification unit 207 that is described later and an operation instruction inputted via the operation unit 203 from a passenger of the vehicle. Note that the passenger relation generation unit 206, based on passenger information identified by the later-described person identification unit 207, social graph information received from an SNS web service via the communication unit 204, and the like, may estimate the relatedness between people and generate group information. Alternatively, group information that was registered in the past may be obtained from the same vehicle or another vehicle from the vehicle service provision server 106.

The person identification unit 207 executes identification processing for identifying passengers. Based on facial images from the camera 201 (or speech information from the audio sensor 202) and characteristic amounts according to a face or voice included in the passenger information registered in advance in the recording unit 215, passengers are identified, and information for identifying passengers for whom processing is to be performed is identified. At that time, the person identification unit 207 can determine if there are passengers for whom passenger information cannot be obtained among the plurality of passengers, as the result of performing identification processing for each of the plurality of passengers. One case where passenger information cannot be obtained is a case in which passenger information has not been registered (in other words, information for identifying a passenger cannot be identified), for example. The person identification unit 207 may further be provided with a function for estimating the gender, age, and height of a passenger from an image, and a function for obtaining a level of similarity between the faces of the plurality of passengers.

An output information selection unit 208 first obtains information identified based on the relatedness between the plurality of passengers. The output information selection unit 208, for example, issues a search query corresponding to an output candidate setting associated with the relatedness of the group information, and obtains, from the content providing server 105, information of output candidates corresponding to the search query. Furthermore, based on preference information comprised in each passenger group, a priority order is applied to the obtained information of output candidates, and information to be outputted to the passengers is selected. The output information selection unit 208 outputs the selected information to an information provision unit 209. Furthermore, the output information selection unit 208, in a case where the person identification unit 207 determined that there are people for which passenger information cannot be obtained among the plurality of passengers, can select information to be outputted based on characteristics based on the appearance of the passengers (or the people for whom passenger information could not be obtained only). Processing of the output information selection unit 208 will be described later.

The information provision unit 209, so that information identified by the output information selection unit 208 is outputted from an output unit of a navigation display unit 213 or the like, provides the identified information to the navigation display unit 213. Note that the information provision unit 209 may also provide the function of the output information selection unit 208.

A panel display unit 212 includes a display panel such as an LCD or OLED, for example, and provides information to be displayed to the driver, and displays various measurement values in the vehicle such as the speed of the vehicle. The panel display unit 212 functions as an output unit for displaying information provided by the information provision unit 209. The navigation display unit 213 includes a display panel such as an LCD or OLED, and displays navigation screens, menu screens for various settings and various operations, and operation screens for passenger registration. Also, the navigation display unit 213 functions as an output unit for displaying information provided by the information provision unit 209.

An audio output unit 214 includes a speaker arranged in a vehicle, for example, and navigation audio or warning audio is outputted therefrom. Also, the audio output unit 214 functions as an output unit for outputting, as audio, information provided by the information provision unit 209.

The recording unit 215 includes, for example, a semiconductor memory or non-volatile recording media such as an HDD, and records setting values necessary for the operation of the information provision apparatus 200 and the foregoing passenger information and group information. The memory 216 includes a volatile storage medium such as a DRAM, for example, and temporarily stores parameters for the CPU 210 to execute a program or processing results.

<Processing Corresponding to Passenger Registration>

Figure 3:
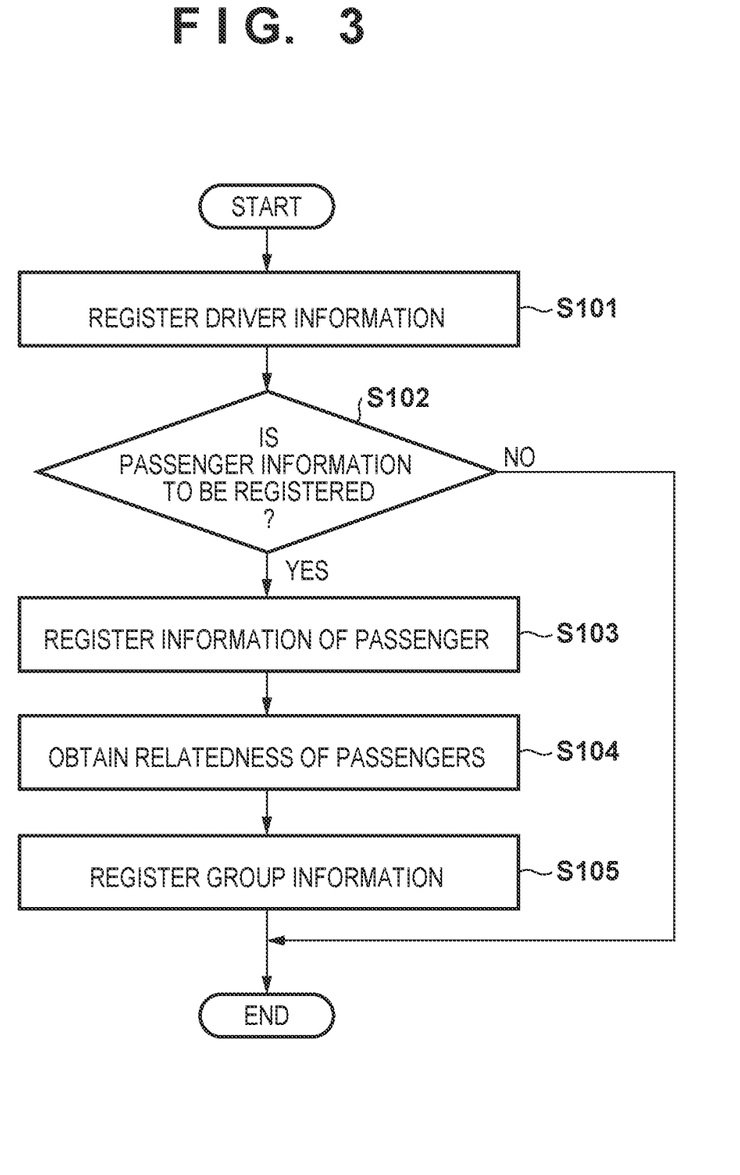
FIG. 3 is a flowchart for illustrating an operation of passenger registration processing according to the first embodiment.

Next, with reference to FIG. 3, passenger registration processing is described. Note that it is assumed that in this processing, the processing that the control unit 205 illustrated in FIG. 2 and its internal units execute is realized by the CPU 210 executing a program. Note that in a case where a passenger has already been registered, it is possible to omit this processing.

In step S101, the control unit 205 accepts an operation instruction from the driver via the operation unit 203, and registers passenger information of the driver. The passenger information of the driver is registered as passenger information corresponding to information for identifying the driver. For example, the person identification unit 207 obtains an image from the camera 201 and audio from the audio sensor 202, extracts characteristic amounts according to the face or speech of the driver to be used to identify the driver, and registers them in the passenger information. The person identification unit 207 may identify the age, the gender, the height, or the like of a passenger, and register them in the passenger information.

In step S102, the control unit 205 determines whether information of a passenger is to be registered. For example, the control unit 205, in a case where an operation instruction to register information of a passenger is inputted via the operation unit 203 by the driver, advances to step S103. Meanwhile, the control unit 205, in a case where an operation instruction to not register information of a passenger is inputted, ends the passenger registration processing without performing the processing of step S103 to step S105.

In step S103, the control unit 205 accepts an operation instruction from the driver via the operation unit 203, and registers passenger information of passengers. The passenger information of the passengers is registered as passenger information corresponding to information for identifying the passengers. For example, the person identification unit 207 obtains an image from the camera 201 and audio from the audio sensor 202, extracts characteristic amounts according to a face or speech of a passenger to be used to identify the passenger, and registers them in the passenger information. The person identification unit 207 may identify the age, the gender, the height, or the like of a passenger, and register them in the passenger information. In a case where there are a plurality of passengers, passenger information for the plurality of passengers is registered.

In step S104, the control unit 205 obtains relatedness of the passengers. For example, the control unit 205 sets the relatedness of passengers based on an operation instruction from the driver received via the operation unit 203. The driver can set the relatedness to family, friends, co-workers, or the like, for example. In a case where there is no common element in particular between the plurality of passengers, "acquaintance" may be set as the relatedness for the passengers.

Alternatively, the control unit 205 may obtain passenger relatedness by estimation. For example, firstly, the gender and age of the passengers is estimated by the person identification unit 207 using facial images from the camera 201, and a level of similarity is determined between the driver and the passengers. Also, the passenger relation generation unit 206, for example, estimates a family relatedness in a case where a passenger is estimated to be a child, and a level of facial similarity to the driver is high. Alternatively, the passenger relation generation unit 206, based on social graph information, user information, or the like received from the SNS web service 104, may estimate that the driver and a passenger are friends or co-workers. In such a case, the control unit 205 displays an estimation result on the navigation display unit 213, and receives confirmation from the driver. Note that in the present invention, selection of output information based on passenger relatedness is not an essential configuration, and therefore this step may be omitted as appropriate depending on the embodiment.

In step S105, the passenger relation generation unit 206, based on passenger information identified by the person identification unit 207 and the obtained passenger relatedness, generates group information as illustrated in FIG. 5A. The group information is recorded in the recording unit 215. The control unit 205 ends this processing when the group information is recorded in the recording unit 215. Note that in the present invention, selection of output information based on passenger relatedness is not an essential configuration, and therefore the generation and recording of group information may be omitted as appropriate depending on the embodiment.

Note that configuration may be taken such that the control unit 205, after registering group information in step S105, further sets a default output candidate setting corresponding to the relatedness (for example, friends) registered in the group information to appropriate output candidates. For example, configuration may be taken so as to, for "friends", change a setting that lists, as candidates, information that is broadly and generally applicable to a setting that lists, as candidates, information common to the registered passengers (for example, a sport in the case of friends connected by a particular sport).

<Output Information Obtainment Processing>

Figure 4A:
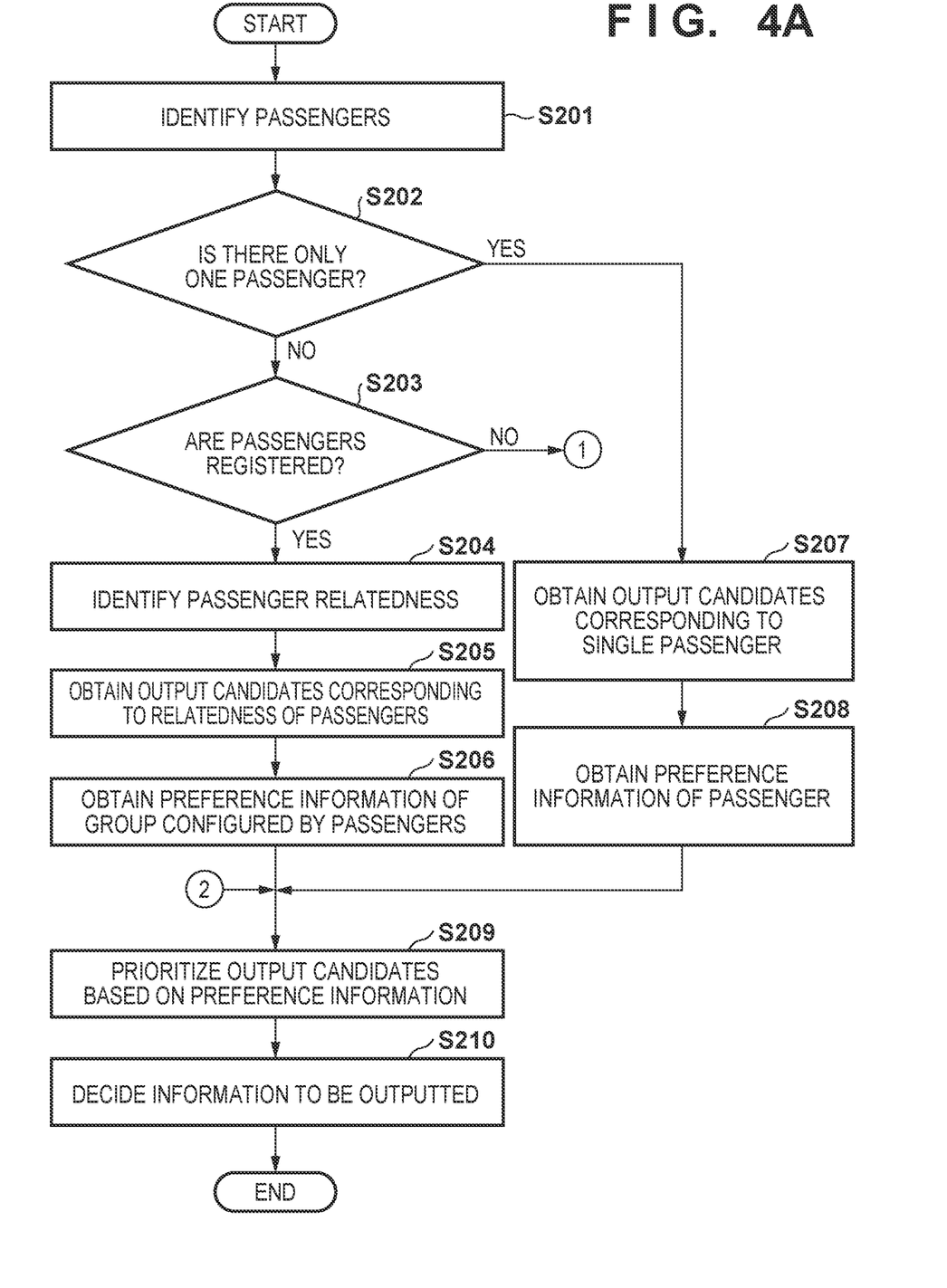
FIG. 4A and FIG. 4B are flowcharts for illustrating operations of output information obtainment processing according to the first embodiment.
Figure 4B:
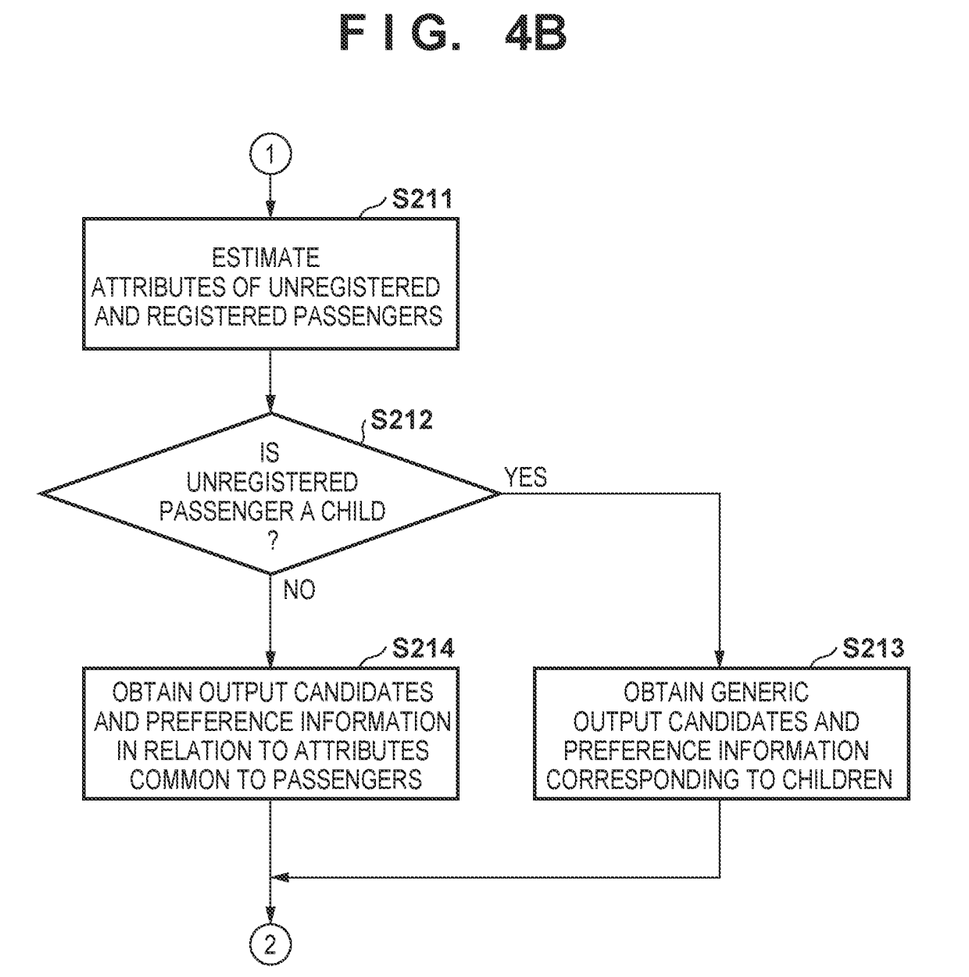

Next, with reference to FIG. 4A and FIG. 4B, output information obtainment processing will be described. Note that it is assumed that in this processing, the processing that the control unit 205 illustrated in FIG. 2 and its internal units execute is realized by the CPU 210 executing a program.

In step S201, the control unit 205 identifies the passengers in the vehicle. Specifically, the person identification unit 207 executes identification processing for identifying passengers. Based on facial images from the camera 201 (or speech information from the audio sensor 202) and characteristic amounts according to a face or voice included in passenger information registered in advance in the recording unit 215, passengers are identified, and information for identifying passengers to be processed is identified.

In step S202, the control unit 205 determines whether the number of passengers recognized by the person identification unit 207 is one. The control unit 205, in the case where the number of passengers is determined to be one, advances to step S207, and in the case where the number of passengers is more than one, advances to step S203.

In step S203, the control unit 205 determines whether there is a passenger among the passengers in the vehicle who has not been registered. For example, the person identification unit 207, in accordance with the result of the processing of step S201, determines whether there is a passenger who has not been registered in the passenger information recorded in the recording unit 215. Depending on this determination, processing differs in a case where there is a passenger who has not been registered (simply referred to as an unregistered passenger) and in a case where there is no unregistered passenger. The control unit 205, in a case where the passengers identified in step S201 are registered passengers, advances to step S204. Meanwhile, in a case where a passenger cannot be recognized or in a case of a passenger who has not been registered, the processing advances to step S211. The processing from step S211 to step S214 will be described later.

In step S204, the control unit 205 identifies relatedness of the passengers. Specifically, the output information selection unit 208 identifies a group configured by the passengers, and identifies a relatedness of the identified group. The group identification may be performed by various methods, and for example, the output information selection unit 208 may identify a group whose registered members best match the identified passengers. At that time, in a case where there are a plurality of groups for which a degree of matching is similarly high, a plurality of groups are identified. Specifically, assume the passengers specified in step S201 are passenger A and passenger B indicated in FIG. 5A. In such a case, the output information selection unit 208 identifies two groups (group α and group γ) as groups that are configured by the identified passengers.

Specifically, in the example of FIG. 5A, each of group α, group γ, and group Δ includes passenger A and passenger B as registered members. Out of these, group α and group γ each has three registered member, and group Δ has four. Since there are two passengers identified in step S201 (A and B), the groups for which the members of the registered group and the identified passengers best match are group α and group γ. Since the degree of matching with the identified passengers is lower for group Δ than for the other two groups, it is not selected. The output information selection unit 208 identifies the relatedness of the identified group α and group γ (co-workers and friends in the example of FIG. 5B) as the relatedness of the passengers.

In step S205, the control unit 205 obtains information of output candidates corresponding to the passenger relatedness. Specifically, the output information selection unit 208 transmits, to the content providing server 105, a search query corresponding to output candidate settings for each relatedness (for example, co-workers and friends) identified in step S204, and receives the results of a search corresponding to each relatedness. For example, for the received search results, a list indicating URLs of information matching the search query and metadata of respective content information including information such as a title, a category, or the like are received. In other words, the received search results are information of output candidates identified in accordance with relatedness.

Figure 6:
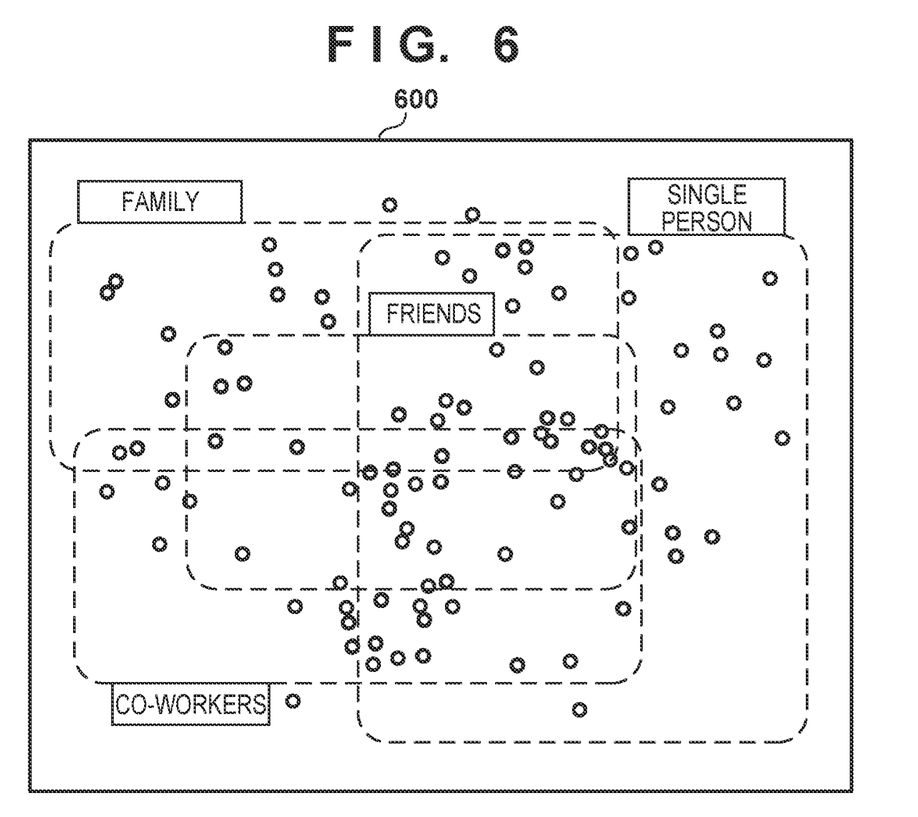
FIG. 6 is a view for schematically describing output candidates according to relatedness of passengers according to the first embodiment.

For example, in FIG. 6, information of output candidates identified in accordance with relatedness is illustrated schematically. In FIG. 6, reference numeral 600 indicates a distribution of multiple pieces of information provided from the content providing server 105. The circular marks indicated in FIG. 6 indicate individual pieces of information. Dashed line frames illustrated in FIG. 6 indicate distributions of information identified as output candidate information from the plurality of information points 600 in the case where information is searched for in accordance with an output candidate setting for which the relatedness is set to "family" or "friends". In a case in which multiple relatednesses are identified in step S204, information of output candidates that belong to both relatedness is obtained. In other words, in a case where the relatednesses "friends" and "co-workers" are identified, output candidate information that corresponds to both the "friends" and the "co-workers" relatednesses is obtained.

Figure 7A:
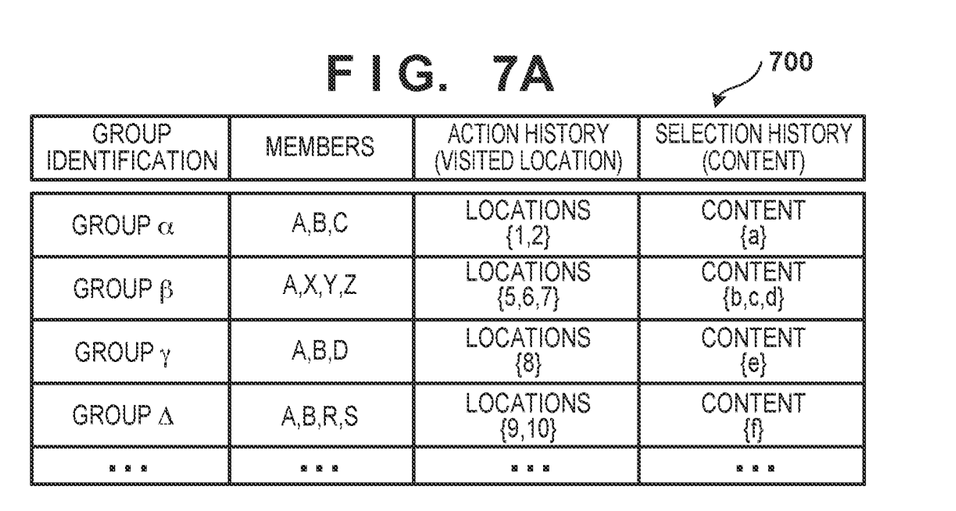
FIG. 7A is a view for describing history information recorded for each group according to the first embodiment.

In step S206, the control unit 205 obtains preference information of a group configured by the passengers. For example, the output information selection unit 208, in order to obtain preference information for a group configured by the passengers, obtains history information recorded for each group. History information recorded for each group, as illustrated in the table 700 of FIG. 7A, for example, includes action history and selection history linked to information for identifying the group. For example, in the action history for group α, locations that the group visited (location 1 and location 2), and, in the selection history for group α, content that the group selected in the vehicle (content a) are recorded.

Figure 7B:
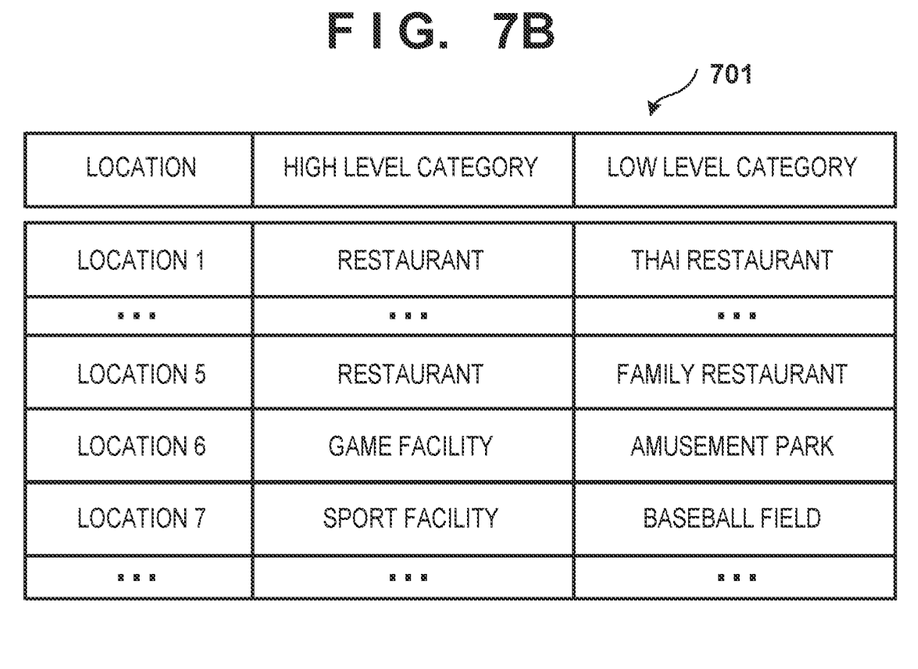
FIG. 7B is a view for describing location information according to the first embodiment.
Figure 7C:
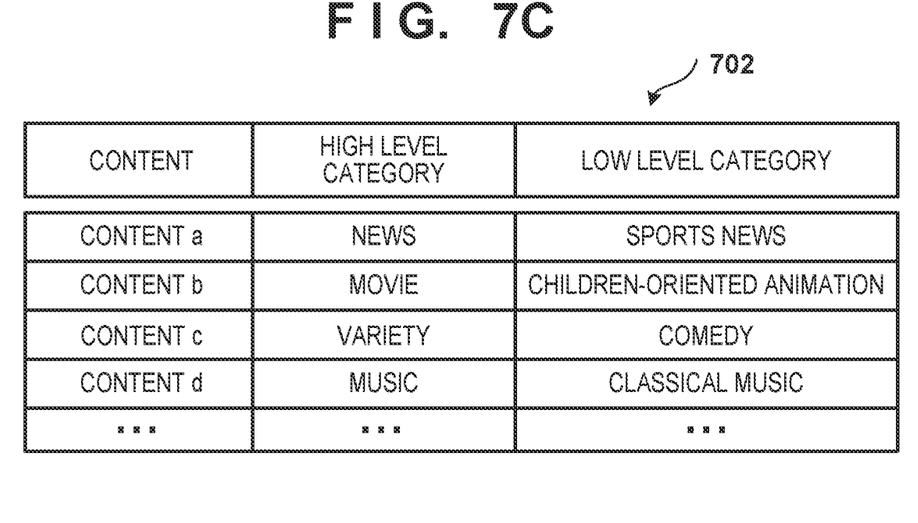
FIG. 7C is a view for describing content information according to the first embodiment.

Regarding location and content information, by referencing tables 701 and 702 as illustrated in FIG. 7B and FIG. 7C, for example, it is possible to identify high and low level categories that the locations and content belong to. The output information selection unit 208, based on a location visited by group α (location 1 or the like) and selected content (content a), generates preference information so that a priority order of information related to "Thai restaurant" and "sports news" is higher. For example, information in which a frequency of appearance for each category, such as "Thai restaurant" and "sports news" is recorded is generated. In other words, information of categories for which a frequency of appearance is high represents the tastes of the group. At that time, the frequency of appearance may be recorded so as to diminish the influence of old history. Note that preference information of the group may generated in advance prior to executing step S206, and recorded in the recording unit 215 in association with group information.

In step S207, the control unit 205 obtains information of output candidates corresponding to a single passenger. For example, the output information selection unit 208 transmits to the content providing server 105 a search query corresponding to an output candidate setting where the relatedness is "single person", and receives the results of a search for "single person".

In step S208, the control unit 205 obtains preference information of the single passenger. For example, the output information selection unit 208, in order to obtain preference information for a single passenger, obtains history information recorded for the single passenger. Note that history information (not shown) recorded for the respective passenger is generated in cases where there is only one passenger. Regarding the history information recorded for the respective passenger, similarly to the history information for each group illustrated in FIG. 7A, for example, action history and selection history linked to information for identifying an individual person (in other words, passenger information) may be included. The output information selection unit 208, based on locations visited by the individual and content selected by the individual, generates preference information set so that a priority order of related information becomes higher. Note that preference information of the individual may generated in advance prior to executing step S207, and recorded in the recording unit 215. Also, the preference information may be included in the passenger information as a part of the registration information.

In step S209, the control unit 205 performs a prioritization of output candidates based on the preference information. For example, the output information selection unit 208, in relation to information of output candidates obtained in step S205 (or step S207), adds evaluation values corresponding to the preference information obtained in step S206 (or step S208) (in other words, adds a high evaluation value to information related to a category with a high frequency of appearance). Also, output candidate information is rearranged in order from highest to lowest evaluation value.

In step S210, the control unit 205 decides information to be outputted. For example, the output information selection unit 208 decides predetermined number of information points among the high priority information as information to be outputted. The output information selection unit 208 outputs to the information provision unit 209 information to be outputted, and the information provision unit 209 causes the navigation display unit 213, for example, to display the received information (for instance, information list). After that, the control unit 205 ends this processing. Note that processing (step S204 to step S206) in a case where all of the passengers are registered passengers, and processing for prioritization of output candidates (step S209) and for deciding output information (step S210) is not necessarily limited to the foregoing processing, and another method may be used if it can provide information to passengers.

In this way, if the passengers are registered passengers, it is possible to identify a group configured by passengers in the vehicle, and it is possible to output information in accordance with the relatedness of the passengers and preference information for the group. Meanwhile, in a case where there is a passenger who has not been registered (simply referred to as an unregistered passenger), it is not possible to obtain the relatedness of corresponding passengers and preference information for each group. In such a case, configuration may be taken to preferentially use characteristic information of an unregistered passenger (a characteristic based on their appearance, for example) to be able to output information related to the unregistered passenger.

With such a configuration, it is possible to provide information that is easier for unregistered passengers to talk about.

Next, the processing from step S211 to step S214 will be described. The processing of step S211 to step S214 is executed in a case where it is determined that among the passengers in the vehicle there is a passenger who has not been registered. In step S211, the output information selection unit 208 estimates attributes of a passenger (an unregistered passenger) who has not been registered and attributes of a passenger who has been registered. For example, the person identification unit 207 obtains an image that captures the passengers from an input unit such as the camera 201, and based on the captured image, identifies appearance characteristics of the passengers. For example, the person identification unit 207 estimates an age, gender, and height, which are attributes of each passenger, and outputs the estimation results to the output information selection unit 208. The output information selection unit 208, based on the results of estimation by the person identification unit 207, estimates attributes such as an age range for each unregistered passenger and registered passenger.

In step S212, the control unit 205 determines whether an unregistered passenger is a child. For example, the output information selection unit 208, based on the estimated attributes, determines whether the unregistered passenger is a child, and for example, in a case where the estimated age range is less than or equal to a predetermined age range, determines that the unregistered passenger is a child, and advances to step S213. In a case where the unregistered passenger is determined not to be a child, the output information selection unit 208 advances to step S214.

In step S213, the control unit 205 obtains generic output candidates and preference information corresponding to children. For example, the output information selection unit 208 obtains information of child-oriented output candidates provided from the vehicle service provision server 106. For generic output candidates for children, advance setting is performed so that child-oriented information is included in candidate information, for example. Furthermore, the output information selection unit 208 obtains generic preference information for children from the vehicle service provision server 106, for example. The generic preference information for children is generated based on action history of groups including children (may be groups for which there is a relatedness of "family") from among group history information of other passengers that the vehicle service provision server 106 uploaded from a plurality of vehicles.

In step S214, the control unit 205 obtains output candidates and preference information corresponding to attributes common to attributes estimated in relation to unregistered passengers and attributes estimated in relation to registered passengers. For example, the output information selection unit 208, in a case where the attributes estimated in relation to unregistered passengers and the attributes estimated in relation to registered passengers are common for a predetermined age range, information of output candidates for that range is obtained from the vehicle service provision server 106. Output candidates corresponding to each age range are set in advance so that information that is generally enjoyed for each age range is included in the candidate information, for example. Furthermore, the output information selection unit 208 obtains preference information for the same age range from the vehicle service provision server 106, for example. The preference information for each age range is generated based on action history of passenger groups or of single passengers for the target age range from among group history information of other passengers that the vehicle service provision server 106 uploaded from a plurality of vehicles, for example. Also, the output information selection unit 208, in a case where the attributes estimated in relation to unregistered passengers and the attributes estimated in relation to registered passengers are common for a gender, information of output candidates for that gender is obtained from the vehicle service provision server 106. Output candidates corresponding to males or females, are set in advance so that information that is generally enjoyed for each gender is included in the candidate information. Note that in a case where attributes estimated for unregistered passengers and attributes estimated for registered passengers are not common, predetermined output candidates that are most typical, and preference information therefor, are obtained. When the control unit 205 obtains the output candidates and preference information, the control unit 205 advances to step S209, and executes the above-described processing. By the processing of step S214, the information provision apparatus 200 can select information to be outputted, based on attributes that are common between attributes of unregistered passengers and attributes of registered passengers that are estimated based on appearance characteristics.

Note that in the example of step S213, information corresponding to children was obtained using an estimated age, but the children estimation may also be made using an estimated height. Furthermore, a weight of a passenger may be measured using a weight meter (not shown) and may be used together with an estimated age or height.

In the present embodiment as described above, configuration was taken such that, in a case where there is a passenger who has not been registered in the plurality of passengers, information obtained based on an appearance characteristic acquired via the camera 201 corresponding to a passenger that has not been registered is provided to the navigation display unit 213. With such a configuration, it is possible to provide information that corresponds to the people there at the time even in a case where information is registered for some of the people and not registered for others.

Note that in the foregoing embodiment, description was given for an example in which a priority order for the information is obtained using preference information in which frequency of appearance is recorded for each category of information. However, the method for obtaining the priority order using preference information may be another method such as a method that uses statistical processing (for example, deep learning or the like). Furthermore, a method that does not explicitly generate the priority order may be used if preference information is substantially extracted. For example, configuration may be taken to input history information for a group that is the target of processing (for example, a distribution of locations or content), and to use a neural network that outputs probabilities that the group will favor respective information of output candidates. In such a case, based on the probabilities that the group will favor the information, a priority order of the information of the output candidates may be obtained.

<Other Embodiments>

In the first embodiment, an example in which the information provision apparatus 200 is an apparatus installed in a vehicle, and a case in which passenger registration processing and output information obtainment processing is executed in the vehicle was described. However, the information provision apparatus that executes the passenger registration processing and the output information obtainment processing may be installed in the vehicle service provision server 106, for example. In such a case, an electronic apparatus that comprises various input units (the camera 201, the audio sensor 202, and the operation unit 203), the communication unit 204, and output units (the panel display unit 212, the navigation display unit 213, and the audio output unit 214) may be installed in the vehicle. The electronic apparatus, for example, transmits input information from each input unit to the vehicle service provision server 106 via the communication unit 204, and on the other hand receives, with the communication unit 204, information transmitted from the vehicle service provision server 106 and outputs it to the output unit.

Figure 8:
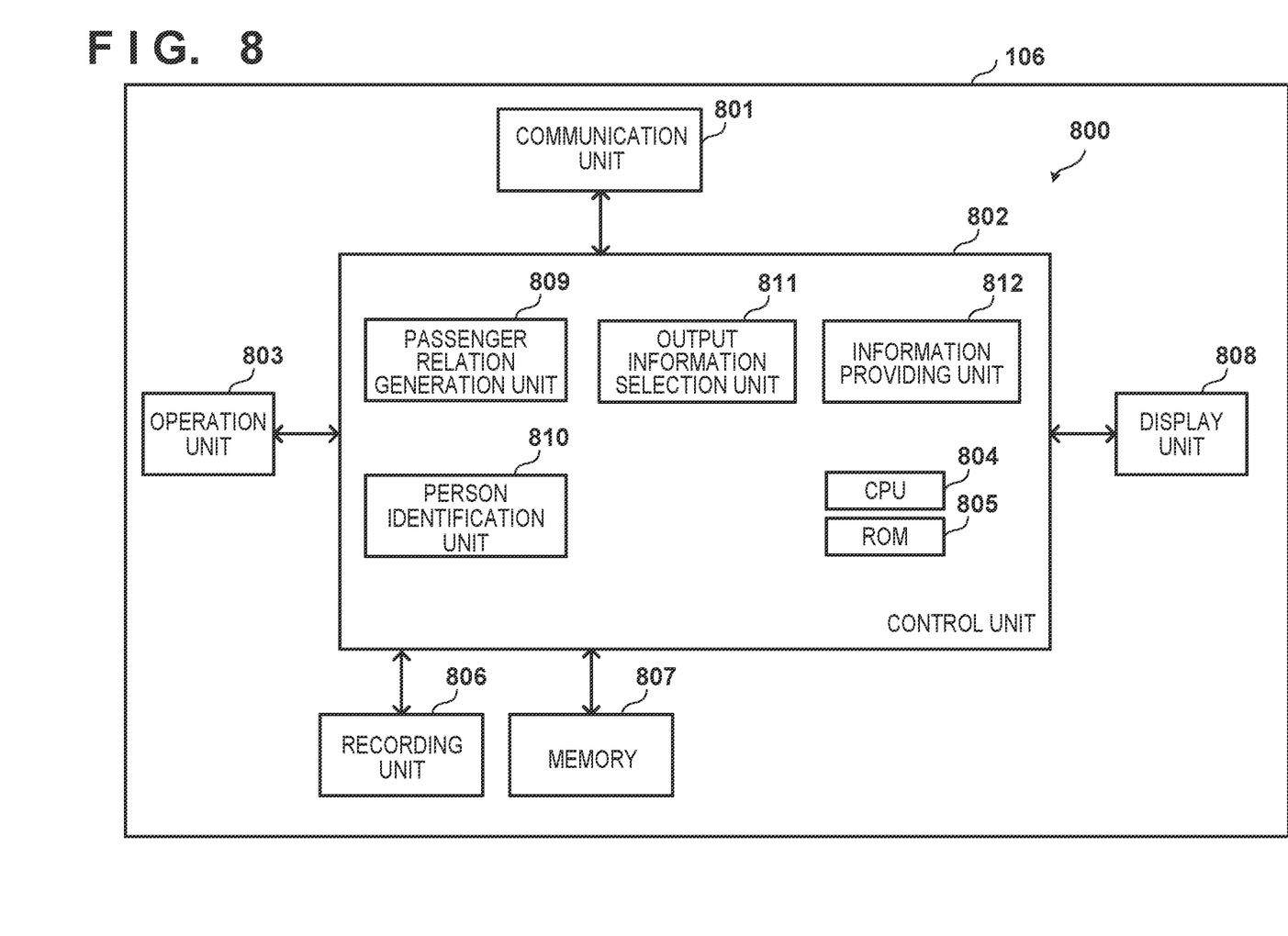
FIG. 8 is a block diagram for illustrating an example of a functional configuration of a vehicle service provision server in another embodiment.

In the vehicle service provision server 106, an information provision apparatus 800 that performs the passenger registration processing and the output information obtainment processing has a configuration as illustrated in FIG. 8, for example.

A communication unit 801 includes a communication circuit for communicating via the network 103 with an electronic apparatus in the vehicle or the SNS web service 104. A control unit 802 includes a CPU 804 which is a central processing unit and a ROM 805 which is a non-volatile memory. The CPU 804, by loading a program stored in the ROM 805 into a memory 807 and executing the program, controls each unit within the control unit 802 and controls an operation of each unit of the vehicle service provision server 106. A function of the control unit 802 may be realized by one CPU 210, and may be realized using another CPU and a GPU (not shown).

A passenger relation generation unit 809 generates group information illustrated in FIG. 5A, and records it in the recording unit 806, for example. The passenger relation generation unit 809 can generate group information based on an operation instruction transmitted from a vehicle and passenger information identified by the later-described person identification unit 810. Note that the passenger relation generation unit 809, based on passenger information identified by the later-described the person identification unit 810, social graph information received from an SNS web service via the communication unit 801, and the like, may estimate the relatedness between people and generate group information.

The person identification unit 810 executes identification processing for identifying passengers. Passengers are identified based on facial images from the camera 201 of the vehicle (or speech information from the audio sensor 202) received by the communication unit 801 and characteristic amounts according to a face or speech included in passenger information registered in the recording unit 806 in advance, and information for identifying the passengers that are the target of processing is identified. At that time, the person identification unit 810 can determine if there are passengers for whom passenger information cannot be obtained among the plurality of passengers, as the result of performing identification processing for each of the plurality of passengers. One case in which passenger information cannot be obtained is a case in which passenger information has not been registered, as described above. The person identification unit 810 may further be provided with a function for estimating the gender, age, and height of a passenger from an image, and a function for obtaining a level of similarity between the faces of the plurality of passengers.

An output information selection unit 811 obtains information identified based on the relatedness between the plurality of passengers. The output information selection unit 811, for example, issues a search query corresponding to an output candidate setting associated with the relatedness of the group information, and obtains from the content providing server 105 information of output candidates corresponding to the search query. Furthermore, based on the preference information comprised in each passenger group, a priority order is applied to the obtained information of output candidates, and information to be outputted to the passengers is identified. The output information selection unit 811 outputs the identified information to the information provision unit 812. Furthermore, the output information selection unit 811, in a case where the person identification unit 810 determined that passenger information cannot be obtained for some of the plurality of passengers, can identify information to be outputted based on characteristics based on the appearance of the passengers (or the people for whom passenger information could not be obtained).

An information providing unit 812, so that information identified by the output information selection unit 811 is outputted from an output unit of the navigation display unit 213 in the vehicle or the like, provides the identified information to the navigation display unit 213 in the vehicle via the communication unit 801. Note that the information providing unit 812 may also provide the function of the output information selection unit 811.

A recording unit 806 includes, for example, a semiconductor memory or non-volatile recording media such as an HDD, and records setting values necessary for the operation of the information provision apparatus 800 and the foregoing passenger information, group information, and preference information for each group, and the like. The memory 807 includes a volatile storage medium such as a DRAM, for example, and temporarily stores parameters for the CPU 804 to execute a program or processing results.

An operation unit 803 is, for example, a mouse or a keyboard, and the operation unit 803 inputs and notifies the control unit 802 of instructions for causing the vehicle service provision server 106 to operate. A display unit 808 includes a display monitor, for example.

In a case of using such an information provision apparatus 800, operations described as being executed by the control unit 205 in step S101 to step S105 of the above-described passenger registration processing and step S201 to step S214 of the output information obtainment processing may be executed by the control unit 802. Furthermore, processing that the passenger relation generation unit 206, the person identification unit 207, the output information selection unit 208, and the information provision unit 209 execute may be executed by the passenger relation generation unit 809, the person identification unit 810, the output information selection unit 811, and the information providing unit 812. As described previously, input information obtained by the input units 201 to 203 is received by the communication unit 801 and supplied to the control unit 802. Also, information outputted from the information providing unit 812 is transmitted to an apparatus on the vehicle side via the communication unit 801, and provided to the navigation display unit 213 which is an output unit.

The information provision apparatus 800, by being installed in the vehicle service provision server 106, can execute passenger recognition processing and processing for prioritizing information based on preference information at a higher speed by using greater computational resources. Also, when performing these processes, it is possible to perform learning using large volumes of data, and to use large-scale algorithms (for deep learning, for example). In other words, it is possible to obtain processing results having higher accuracy.

<Summary of Embodiments>

1. The information provision apparatus (for example, reference numeral 200 or 800) in foregoing embodiments comprises:

an obtaining unit configured to identify a plurality of people and obtain registration information for each of the plurality of people (for example, reference numeral 207 or 810 and step S201);

an information provision unit configured to, in order to cause information to be perceivably outputted from an output unit (for example, reference numeral 213) to the plurality of people, provide predetermined information to the output unit (for example, reference numeral 209 or 812); and a selection unit configured to select the predetermined information (for example, reference numeral 208 or 811), wherein the selection unit, in a case where there is a person, among the plurality of people, for whom the registration information cannot be obtained, selects the predetermined information based on input information obtained via an input unit for the person for whom the registration information cannot be obtained (for example, step S203, step S213, and step S214).

By virtue of the foregoing embodiments, it becomes possible to provide information that corresponds to the people there at the time even in a case where information is registered for some of the people and not registered for others.

2. In the foregoing embodiments, the selection unit, in a case where there is no person, among the plurality of people, for whom the registration information cannot be obtained, selects the predetermined information based on the registration information obtained by the obtaining unit, and in a case where there is a person, among the plurality of people, for whom the registration information cannot be obtained, selects the predetermined information based on the input information.

By virtue of the foregoing embodiments, it is possible to select information using different information in accordance with a case in which there is a person for whom registration information cannot be obtained and a case in which there is no person for whom registration information cannot be obtained.

3. In the foregoing embodiments, the input information includes an appearance characteristic of the person for whom the registration information cannot be obtained.

By virtue of the foregoing embodiments, it becomes possible to provide information corresponding to an appearance characteristic of an unregistered person.

4. In the foregoing embodiments, the appearance characteristic includes information of either an age or a gender of the person for whom the registration information cannot be obtained, which is estimated based on an image obtained from the input unit.

By virtue of the foregoing embodiments, it becomes possible to provide child-oriented information in a case where the unregistered person is a child, and to provide female-oriented information in a case where the unregistered person is a female.

5. In the foregoing embodiments, an identification unit (for example, step S211) configured to, based on the input information, identify an attribute corresponding to the person for whom the registration information cannot be obtained, and for a person for whom the registration information can be obtained, identify, based on input information obtained via an input unit, an attribute corresponding to the person for whom the registration information can be obtained is further comprised, wherein the selection unit, based on an attribute that is common between the attribute corresponding to the person for whom the registration information cannot be obtained and the attribute corresponding to the person for whom the registration information can be obtained, which are identified by the identification unit, selects the predetermined information (for example, step S214).

By virtue of the foregoing embodiments, it becomes possible to provide information related to an attribute common between an unregistered person and a registered person, for example.

6. In the foregoing embodiments, the selection unit, in a case where there is no person for whom the registration information cannot be obtained (for example, step S203), obtains a relatedness of the plurality of people based on the obtained registration information (for example, step S204), and based on the relatedness, selects the predetermined information.

By virtue of the foregoing embodiments, it becomes possible to provide information corresponding to a relation between a plurality of people.

7. In the information provision apparatus of the foregoing embodiments, the obtaining unit, based on an image or audio obtained from the plurality of people, identifies each of the plurality of people (for example, reference numeral 207 or 810).

By virtue of this embodiment, it is possible to reduce the burden of manually conveying information related to a plurality of people to an apparatus by the people there at the time each time.

8. In the foregoing embodiments, the plurality of people are people in a space inside a vehicle.

By virtue of this embodiment, it is possible to promote conversation in the space inside the vehicle, and facilitate smoother information sharing.

9. A method of controlling the same the information provision apparatus (for example, reference numeral 200 or 800) in foregoing embodiments comprises:

an obtaining step of an obtaining unit identifying a plurality of people and obtaining registration information for each of the plurality of people (for example, step S201);

an information provision step of an information provision unit, in order to cause information to be perceivably outputted from an output unit to the plurality of people, providing predetermined information to the output unit (for example, step S204); and a selection step of a selection unit selecting the predetermined information (for example, step S209, step S213, and step S214), wherein in the selection step, in a case where there is a person, among the plurality of people, for whom the registration information cannot be obtained (for example, step S203), the predetermined information is selected based on input information obtained via an input unit for the person for whom the registration information cannot be obtained (for example, step S212 to step S214).

By virtue of the foregoing embodiments, it is possible to provide information that corresponds to the people there at the time even in a case where information is registered for some of the people and not registered for others.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information provision apparatus comprising:
a processor; and
a memory storing instructions which, when executed by the processor, cause the information provision apparatus to function as:
an obtaining unit configured to identify a plurality of people and obtain registration information for each of the plurality of people;
an information provision unit configured to, in order to cause information to be perceivably outputted from an output unit to the plurality of people, provide predetermined information to the output unit; and
a selection unit configured to select the predetermined information, wherein the selection unit, in a case where there is a person, among the plurality of people, for whom the registration information cannot be obtained, selects the predetermined information based on input information obtained via an input unit for the person for whom the registration information cannot be obtained.

2. The information provision apparatus according to claim 1, wherein the selection unit,
in a case where there is no person, among the plurality of people, for whom the registration information cannot be obtained, selects the predetermined information based on the registration information obtained by the obtaining unit, and
in a case where there is a person, among the plurality of people, for whom the registration information cannot be obtained, selects the predetermined information based on the input information.

3. The information provision apparatus according to claim 1, wherein the input information includes an appearance characteristic of the person for whom the registration information cannot be obtained.

4. The information provision apparatus according to claim 3, wherein the appearance characteristic includes information of either an age or a gender of the person for whom the registration information cannot be obtained, which is estimated based on an image obtained from the input unit.

5. The information provision apparatus according to claim 1, further comprising an identification unit configured to, based on the input information, identify an attribute corresponding to the person for whom the registration information cannot be obtained, and for a person for whom the registration information can be obtained, identify, based on input information obtained via an input unit, an attribute corresponding to the person for whom the registration information can be obtained,
wherein the selection unit, based on an attribute that is common between the attribute corresponding to the person for whom the registration information cannot be obtained and the attribute corresponding to the person for whom the registration information can be obtained, which are identified by the identification unit, selects the predetermined information.

6. The information provision apparatus according to claim 1, wherein the selection unit, in a case where there is no person for whom the registration information cannot be obtained, obtains a relatedness of the plurality of people based on the obtained registration information, and based on the relatedness, selects the predetermined information.

7. The information provision apparatus according to claim 1, wherein the obtaining unit, based on an image or audio obtained from the plurality of people, identifies each of the plurality of people.

8. The information provision apparatus according to claim 1, wherein the plurality of people are people in a space inside a vehicle.

9. A control method of an information provision apparatus comprising:
identifying a plurality of people and obtaining registration information for each of the plurality of people;
in order to cause information to be perceivably outputted from an output unit to the plurality of people, providing predetermined information to the output unit; and
selecting, by the information provision apparatus, the predetermined information, wherein
in the selecting, in a case where there is a person, among the plurality of people, for whom the registration information cannot be obtained, the predetermined information is selected based on input information obtained via an input unit for the person for whom the registration information cannot be obtained.

* * * * *